Nov. 9, 1971  R. H. WENTORF, JR  3,618,387
MONITORING MEANS FOR TEMPERATURE AND PISTON
STROKE IN SUPERPRESSURE APPARATUS
Filed Jan. 2, 1970
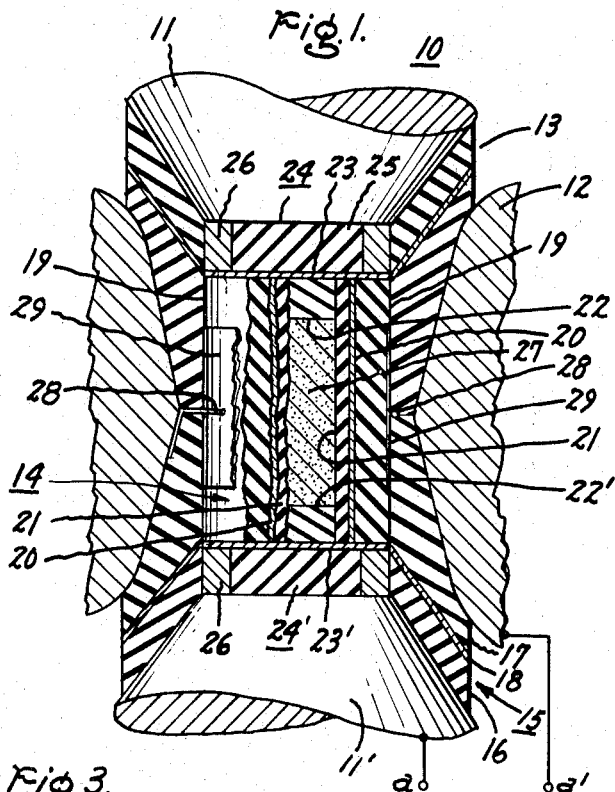
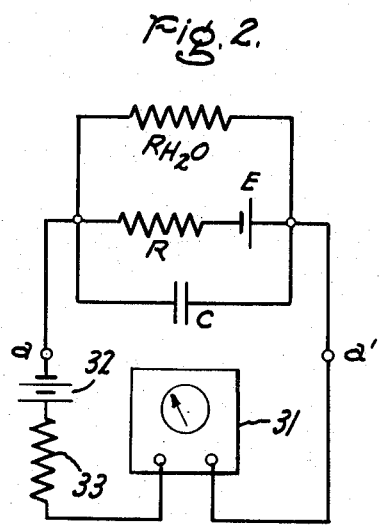
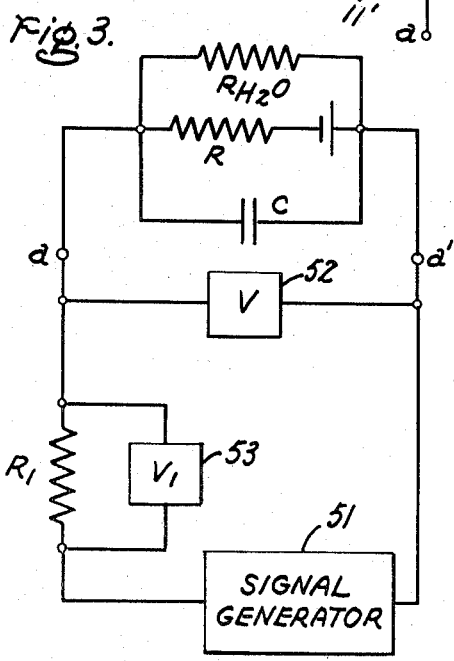
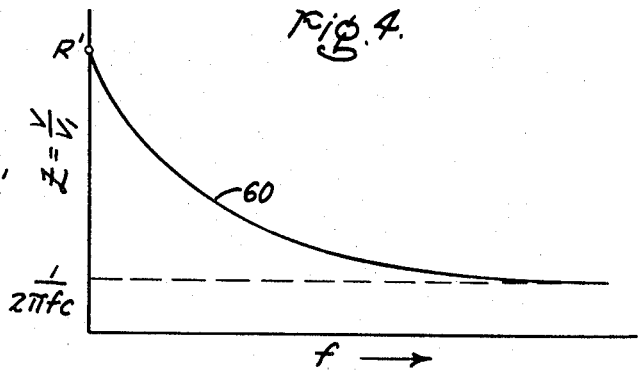
Inventor:
Robert H. Wentorf Jr.
by
His Attorney.

United States Patent Office 3,618,387
Patented Nov. 9, 1971

3,618,387
MONITORING MEANS FOR TEMPERATURE AND PISTON STROKE IN SUPERPRESSURE APPARATUS
Robert H. Wentorf, Jr., Schenectady, N.Y., assignor to General Electric Company
Filed Jan. 2, 1970, Ser. No. 136
Int. Cl. G01k 7/16, 13/00
U.S. Cl. 73—343 R     3 Claims

ABSTRACT OF THE DISCLOSURE

A simple device for monitoring temperatures and piston stroke in a high pressure, high temperature apparatus is disclosed. In a "belt-type" apparatus a metal wire is looped around the reaction vessel, the ends of the wire are twisted together and extended through the surrounding gasket assembly so as to make electrical contact with the surface of the die. Electrical leads are attached to the die and to the punch, which is in turn in electrical contact with the heater tube (indirectly heated cells) or the material to be subjected to the high pressure, high temperature process (direct heating). By employing either D.C. or low frequency A.C. electrical measuring means, the electrical resistance between the wire loop and the heater tube (or electrically conducting charge) may be measured. This electrical resistance changes as a function of the temperature within the reaction cell. By employing high frequency A.C. current measuring means, the electrical capacity between the die and a metallic gasket may be measured. Its value will depend upon the gasket material located therebetween and the separation distance between the metallic gasket and the die. By the latter described measuring means the stroke of the piston (electrically connected to the intermediate metallic gasket) may be monitored.

BACKKGROUND OF THE DISCLOSURE

This disclosure relates generally to the measuring and testing art and is more particularly concerned with simple means for approximate measurement of high temperatures and piston stroke such as are required during the conduct of various processes in high pressure, high temperature apparatuses.

The utilization of thermocouples for the measurement of temperatures (and thereby the determination of pressures) prevailing in high pressure, high temperature processes is described in U.S. Pat. 3,478,595—Strong et al. (incorporated by reference). However, the art is still in need of simpler, reliable methods of monitoring temperature and piston stroke during such processes to provide control of crystal growth, compaction etc.

SUMMARY OF THE INVENTION

The instant invention fulfills this need to a significant extent particularly in the conduct of repetitive closely reproducible industrial high pressure, high temperature processes, as for example, in the manufacture of diamond. The monitoring means for temperature and piston stroke of this invention preferably consists of a loop of slender metal wire disposed about the outside of the reaction vessel of a "belt-type" apparatus (although this invention may be used with other such apparatuses) described in U.S. 2,941,248—Hall. The ends of this wire are twisted together and conducted outwardly into electrical contact with the die wall, via a passageway through the gasket assembly. Means for measuring changes in the electrical characteristics of the electrical circuit created between the wire loop and some current carrying path in the reaction vessel is connected to the die and to the punch. Depending upon the nature of this measuring means (a) the electrical resistance between the wire and the current carrying path (or member) may be measured and/or (b) the electrical capacity between an intermediate metallic gasket (in electrical contact with the piston) and the die may be measured. The resistance measurement provides capability for assessing the temperature in the reaction zone and the electrical capacity measurement provides a measurement of the piston stroke.

BRIEF DESCRIPTION OF THE DRAWING

A preferred embodiment of the invention is illustrated in the following sheet of drawing in which:

FIG. 1 is a schematic representation of high pressure, high temperature apparatus (partially in elevation) in which the monitoring means of the instant invention may be employed;

FIG. 2 is a schematic representation of a D.C. electrical circuit involved in the measurement;

FIG. 3 is a second schematic representation of monitoring apparatus for this invention and FIG. 4 is a graphic display of the manner in which the impedance varies as a function of frequency.

DESCRIPTION OF THE PREFERRED EMBODIMENT

A preferred form of a high pressure, high temperature apparatus in which the monitoring means of the instant invention may be employed is shown embodying the instant invention in FIG. 1. Apparatus 10 includes a pair of cemented tungsten carbide punches 11, 11' and an intermediate "belt" or die member 12 of the same material. Die member 12 includes an aperture 13 in which there is positioned a reaction vessel 14 shown partially in elevation and partially in section. Between each punch 11, 11' and die 12 there is positioned a gasket insulating assembly 15. Each such assembly 15 comprises a pair of thermally insulating and electrically non-conducting members 16, 17 together with an intermediate metallic gasket 18.

In one construction reaction vessel 14 may comprise hollow cylinder 19 made of material such as sodium chloride, pyrophyllite, talc, catlinite and those materials generally meeting the criteria set forth in U.S. 3,030,662—Strong (column 1, lines 25–67). Positioned concentrically within and adjacent cylinder 19 is a graphite electrical resistance heater tube 20. Within graphite heater tube 20 there is also concentrically positioned a cylindrical liner 21 of alumina, magnesia, Vycor glass, etc. The opposite ends of the liner 21 are fitted with a pair of plugs 22, 22' of material comparable to liner 21 to close the ends thereof. Electrically conductive metallic end discs 23, 23' are utilized at each end of cylinder 19 to provide electrical connection to graphite heater tube 20. Adjacent discs 23, 23' are the end cap assemblies 24, 24', respectively, each comprising a plug or disc 25 (preferably made of the same material as element 19) surrounded by an electrically conducting ring 26.

In operation, one or the other of punches 11, 11' is moved toward the other causing thereby the compression of the gasket assembly 15 and reaction vessel 14 to raise the pressure in specimen 27, which may for example be a mixture of graphite and catalyst metal for the conduct of diamond growth by processes described in U.S. 2,947,610—Hull et al. and/or U.S. 2,947,609—Strong. Subsequent to the application of pressure, electrical current is provided from a source (not shown) to flow through punches 11, 11' and graphite resistance heater tube 20 to indirectly heat specimen 27.

The foregoing description relates merely to one high pressure, high temperature apparatus. The instant invention, may, however, also be employed with other apparatuses capable of simultaneously providing high pressures and high temperatures.

According to this invention, a thin wire 28 encircles cylinder 19 and, if desired, a sheet 29 of metal foil may be disposed between wire 28 and the surface of cylinder 19 in direct electrical contact with wire 28. Wire 28 must be resistant to chemical attack by the hot pyrophyllite, salt or other materials used and must have a high enough melting point to remain solid during the exposure. In its simplest arrangement, the two ends of wire 28 are twisted together and brought out through a groove between elements 17 of the two gasket assemblies 15 so that electrical contact may be made between wire 28 and die 12. It has been demonstrated that resistance changes take place in materials of which cylinder 19 would be made under conditions of elevated temperature, e.g. above about 1200° C. The resistivity falls as an exponential function of temperature such that as temperature increases, the resistivity decreases. This relationship for a given cell construction may, therefore, be determined by a series of experiments employing thermocouples in the reaction cell in addition to the wire 28 girding the cell whereby the change in resistance in element 19 as a function of cell temperature may be detected by electrical measurement and thereby calibrated.

An arrangement for determining the change in resistance of this cylinder 19 is shown in FIG. 2 (below match points $a$, $a'$ at which electrical contact is made with piston 11' and die 12, respectively) employing a direct current meter 31 with a D.C. source 32 and a suitable resistance 33. The electrical characteristics of the components physically illustrated in FIG. 1 are shown symbolically by the letters R, E, C, and $H_{H_2O}$ in FIG. 2. These symbols describe the following electrical characteristics: R represents the resistance of cylinder 19; E represents the polarization effect frequently encountered between heater tube 20 and wire 28; C represents the electrical capacity between metallic gasket 18 and die 12, and $R_{H_2O}$ represents the very large resistance (approximately $10^5$ to $10^6$ ohms) of the cooling water circuit (not shown), which extends through the piston and die construction from a common water supply.

The presence or absence of the polarization effect may be readily determined employing the D.C. meter 31 by reversing the polarity of the known D.C. source 32. The small "battery effect" E will be substractive in one instance and additive in the other, when the current is reversed. When E is significant, its value, as well as the value of R, can be calculated from the results of the two measurements of current, because $R_{33}$ and $R_{H_2O}$ are known and C has no effect.

In order to accurately measure R, it is preferred that its value not exceed the value of $R_{H_2O}$. This would be the case, when cylinder 19 is constructed of sodium chloride, which has a resistance of about $10^4$ ohms with temperatures of heater 20 in the range of from about 1200 to 1600° C. With other materials, e.g. pyrophyllite, the resistance R may be close to $R_{H_2O}$. In this instance it is preferable that the sensitivity of the monitoring device be increased and for this reason metal foil 29 may be employed as shown in electrical contact with wire 28.

FIG. 3 schematically illustrates the method of determining the change in impedance in the circuit there illustrated. Once again the electrical measuring means would connect to the apparatus of FIG. 1 at match points $a$, $a'$. The signal generator 51 is employed to introduce a variable frequency (greater than 10 c.p.s.) A.C. current in the circuit in order to determine the value of C and thereby to provide a measure of the stroke (the extent of movement of one or the other of pistons 11, 11' toward die 12). The resistance $R_1$ is a known resistance in the external wiring and under a given high frequency A.C. input voltmeters 52 and 53 provide a reading of V and $V_1$, respectively, the ratio of which $(V/V_1)$ is a measure of impedance of the circuit and, thereby, provides a means for determining C and also R.

The procedure then is first to measure both V and $V_1$ for two separate frequencies, e.g. 100 c.p.s. and $10^4$ c.p.s.

From these values and from the general electrical relationships indicated in FIG. 4, one may calculate curve 60 and thereby determine C and R′ where R′ is $$R \cdot R_{H_2O}/(R + R_{H_2O})$$

Since $R_{H_2O}$ is known, R may then be determined. The higher test frequency used must not be so high that other capacities distributed through the system (besides C) will interfere with the measurements.

The correlation between various values of C and the piston stroke may be established using sensitive mechanical instruments e.g. a dial gage. Such instruments are ordinarily expensive and not sufficiently robust to withstand continuous use as monitors. Furthermore, they may be difficult to read, when properly located behind safety shields, etc.

What I claim as new and desire to secure by Letters Patent of the United States is:

1. In a high pressure, high temperature apparatus wherein separate stationary and movable members coact upon an assembly of insulating gasket elements bounded thereby by the forceful displacement of at least one movable member, said assembly enclosing a reaction vessel, and heating means raise the temperature of said reaction vessel by the passage of elecerical energy along an electrically conducting path within said reaction vessel, the combination with said reaction vessel of means providing an electrically conducting path external to said reaction vessel comprising, (a) a closed loop of metal wire girding said reaction vessel and making electrical contact through said assembly to the stationary member adjacent thereto, the wall of said reaction vessel having a high electrical resistance and separating said wire loop from said electrical conducting path within said reaction vessel, and (b) electrical detection means electrically coupled with said wire loop and said electrically conducting path for sensing leakage current flowing between said electrically conducting path for sensing leakage current flowing between said electrically conducting path and said wire loop.

2. The combination recited in claim 1 wherein the electrical measuring means comprises an external resistance and an A.C. signal generator connected in series and first and second voltmeters, said first voltmeter being connected to measure the voltage drop across said external resistance and said second voltmeter being connected to measure the voltage drop between said at least one movable member and the wire loop.

3. The improvement as recited in claim 1 wherein a sheet of metal foil is disposed between the wire loop and the outer surface of the reaction vessel, said foil sheet being in electrical contact with said wire loop.

References Cited

UNITED STATES PATENTS

| | | | |
|---|---|---|---|
| 2,941,247 | 6/1960 | Bundy | 18—16.5 |
| 2,941,248 | 6/1960 | Hall | 18—16.5 |
| 3,374,501 | 3/1968 | Newhall | 18—16.5 |
| 3,452,597 | 7/1969 | Grady, Jr. | 73—343 |
| 3,521,326 | 7/1970 | Rice et al. | 18—16.5 |

LOUIS R. PRINCE, Primary Examiner

D. M. YASICH, Assistant Examiner

U.S. Cl. X.R.

73—362 AR